(12) United States Patent
Toyohara et al.

(10) Patent No.: US 8,447,498 B2
(45) Date of Patent: May 21, 2013

(54) CONTROL DEVICE FOR INTERNAL COMBUSTION ENGINE

(75) Inventors: Masahiro Toyohara, Hitachiota (JP);
Minoru Okubo, Hitachinaka (JP);
Takao Miyake, Hitachi (JP); Tomohiro Ohisa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 95 days.

(21) Appl. No.: 13/201,535

(22) PCT Filed: Jan. 25, 2010

(86) PCT No.: PCT/JP2010/050869
§ 371 (c)(1),
(2), (4) Date: Aug. 15, 2011

(87) PCT Pub. No.: WO2010/100975
PCT Pub. Date: Sep. 10, 2010

(65) Prior Publication Data
US 2011/0301827 A1 Dec. 8, 2011

(30) Foreign Application Priority Data
Mar. 2, 2009 (JP) .................. 2009-048365

(51) Int. Cl.
*F02P 5/15* (2006.01)

(52) U.S. Cl.
USPC ...... 701/104; 701/110; 701/113; 123/339.11; 123/339.12; 123/406.47; 123/406.53; 123/406.54; 123/406.58; 123/406.59; 123/406.61; 123/406.62; 123/406.26

(58) Field of Classification Search .......... 701/104, 701/110, 113; 123/339.11, 339.12, 406.26, 123/406.47, 406.53, 406.54, 406.58–406.63
See application file for complete search history.

(56) References Cited

U.S. PATENT DOCUMENTS

| | | | |
|---|---|---|---|
| 4,748,567 A | 5/1988 | Sumizawa et al. | |
| 5,280,772 A * | 1/1994 | Weber et al. | 123/339.11 |
| 6,845,749 B2 * | 1/2005 | Kubo | 123/339.11 |
| 7,017,548 B2 * | 3/2006 | Sawada et al. | 123/339.11 |
| 7,032,571 B2 | 4/2006 | Takama et al. | |
| 7,556,020 B2 * | 7/2009 | Kolossow | 123/406.54 |

(Continued)

FOREIGN PATENT DOCUMENTS

| | | |
|---|---|---|
| JP | 55-142233 A | 11/1980 |
| JP | 60-256540 A | 12/1985 |

(Continued)

OTHER PUBLICATIONS

Corresponding International Search Report dated Feb. 23, 2010 (two (2) pages).

(Continued)

*Primary Examiner* — Erick Solis
(74) *Attorney, Agent, or Firm* — Crowell & Moring LLP

(57) ABSTRACT

Even when an engine is started in various combustion states, an excessive increase in engine speed at the start of the engine is suppressed without an influence of the combustion states and with an excellent responsiveness. Ignition timing (or a combustion injection amount) at the start of an internal combustion engine is corrected in accordance with a crank angle cycle ratio which is a ratio of a combustion period crank angle cycle and a reference crank angle cycle.

20 Claims, 14 Drawing Sheets

U.S. PATENT DOCUMENTS

| | | | |
|---|---|---|---|
| 8,326,517 B2 * | 12/2012 | Soejima et al. | 701/105 |
| 2002/0195084 A1 * | 12/2002 | Denz et al. | 123/350 |
| 2005/0145217 A1 | 7/2005 | Takama et al. | |

FOREIGN PATENT DOCUMENTS

| | | |
|---|---|---|
| JP | 63-186948 A | 8/1988 |
| JP | 2000-249032 A | 9/2000 |
| JP | 2001-73848 A | 3/2001 |
| JP | 2005-194902 A | 7/2005 |
| JP | 2006-118517 A | 5/2006 |
| JP | 2008-298032 A | 12/2008 |

OTHER PUBLICATIONS

Form PCT/ISA/237 with English Translation dated Feb. 18, 2010 (twelve (12) pages).

* cited by examiner

R = TPOSburn × n/TREF

CONTROL DEVICE FOR INTERNAL COMBUSTION ENGINE

TECHNICAL FIELD

The present invention relates to a control device for an internal combustion engine (engine), and more particularly, to a control device for an internal combustion engine which prevents an engine speed from overshooting with respect to a target engine speed at the start of the engine.

BACKGROUND ART

An engine speed immediately after the start of an engine increases so as to significantly exceed a target idle speed, and the engine speed converges to the target idle speed after having reached its peak. This is because the engine is started in the state where the inside of an intake pipe at the start of the engine is under atmospheric pressure, and further in the state where a throttle opening degree (and an ISC valve opening degree) are large and accordingly an opening area of an intake passage is sufficiently secured. The reason why the engine speed converges to the target idle speed after having reached its peak is that the throttle opening degree (or the ISC valve opening degree) is controlled by feedback control of the engine speed.

With regard to a control device for an engine, the following conventional technology has been disclosed for preventing an engine speed immediately after the start of the engine from significantly exceeding a target idle speed. That is, until a peak of the engine speed is detected after the start of the engine, a control parameter different from an intake flow rate, which relates to an engine output, for example, ignition timing is set to a side on which the engine output decreases more than a parameter value at the time of a normal idle. Specifically, in the case of ignition timing control, the ignition timing is set to the retard side. After the peak of the engine speed has been detected, the control parameter is returned to the parameter value at the time of the normal idle (for example, Patent Document 1).

In addition, with regard to an ignition timing control device for an engine, a change amount of an engine speed immediately after the start of the engine is calculated as an area per unit time, and an advance amount of ignition timing is controlled in accordance with a value of the area (for example, Patent Document 2).

Patent Document 1: JP Patent Publication (Kokai) No. 2005-194902 A

Patent Document 2: JP Patent Publication (Kokai) No. 2000-249032 A

DISCLOSURE OF THE INVENTION

Problems to be Solved by the Invention

However, in the control device for the engine as disclosed in Patent Document 1, although the engine output is suppressed until the peak of the engine speed appears, because the determination of an influence of a combustion state of the engine is not performed, a stating period of time may be prolonged or the peak of the engine speed after the start of the engine may become extremely small depending on the combustion state of the engine, so that a trouble in starting performance of the engine may occur.

In the ignition timing control device disclosed in Patent Document 2, the change amount of the engine speed immediately after the start of the engine is calculated as an area, whereby it is possible to perform ignition timing correction which is suited to a combustion state at the start of the engine. However, the above-mentioned area is calculated for each predetermined time, and hence an influence of the engine speed and control delay in the ignition timing correction occur, with the result that control responsiveness may be delayed depending on the engine speed at the start of the engine.

The present invention has been made in view of the above-mentioned problems occurring the start of an engine, and therefore has an object to provide a control device for an internal combustion engine which is capable of suppressing, even when the engine is started in various combustion states, an excessive increase in engine speed at the start of the engine without an influence of the combustion states and with an excellent responsiveness.

Means for Solving the Problems

In order to achieve the above-mentioned object, a control device for an internal combustion engine according to the present invention includes: reference rotation position detection means which detects a reference rotation position of a crankshaft of the internal combustion engine; unit crank angle detection means which outputs a crank angle signal per unit crank angle of the crankshaft; reference crank angle cycle calculation means which calculates a reference crank angle cycle on the basis of the reference rotation position detected by the reference rotation position detection means; combustion period crank angle cycle calculation means which calculates a combustion period crank angle cycle on the basis of the crank angle signal from the unit crank angle detection means; crank angle cycle ratio calculation means which calculates a crank angle cycle ratio which is a ratio of the combustion period crank angle cycle and the reference crank angle cycle; and correction means which corrects ignition timing or a fuel injection amount in accordance with the crank angle cycle ratio at a start of the internal combustion engine.

Advantages of the Invention

The control device for the internal combustion engine according to the present invention quantitatively finds out a combustion state at the start of the engine with an excellent responsiveness on the basis of the crank angle cycle ratio which is the ratio of the combustion period crank angle cycle and the reference crank angle cycle, and corrects the ignition timing or the fuel injection amount in accordance with the crank angle cycle ratio. Accordingly, at the start of the engine, it is possible to prevent the starting performance from being impaired and accurately realize engine speed control according to the combustion state at the start, so that a discharge amount of exhaust emission at the start of the engine can be reduced.

The present description encompasses the contents described in the description and/or the drawings of JP Patent Application No. 2009-048365 on the basis of which the right of priority of the present application is claimed.

Figure 1:
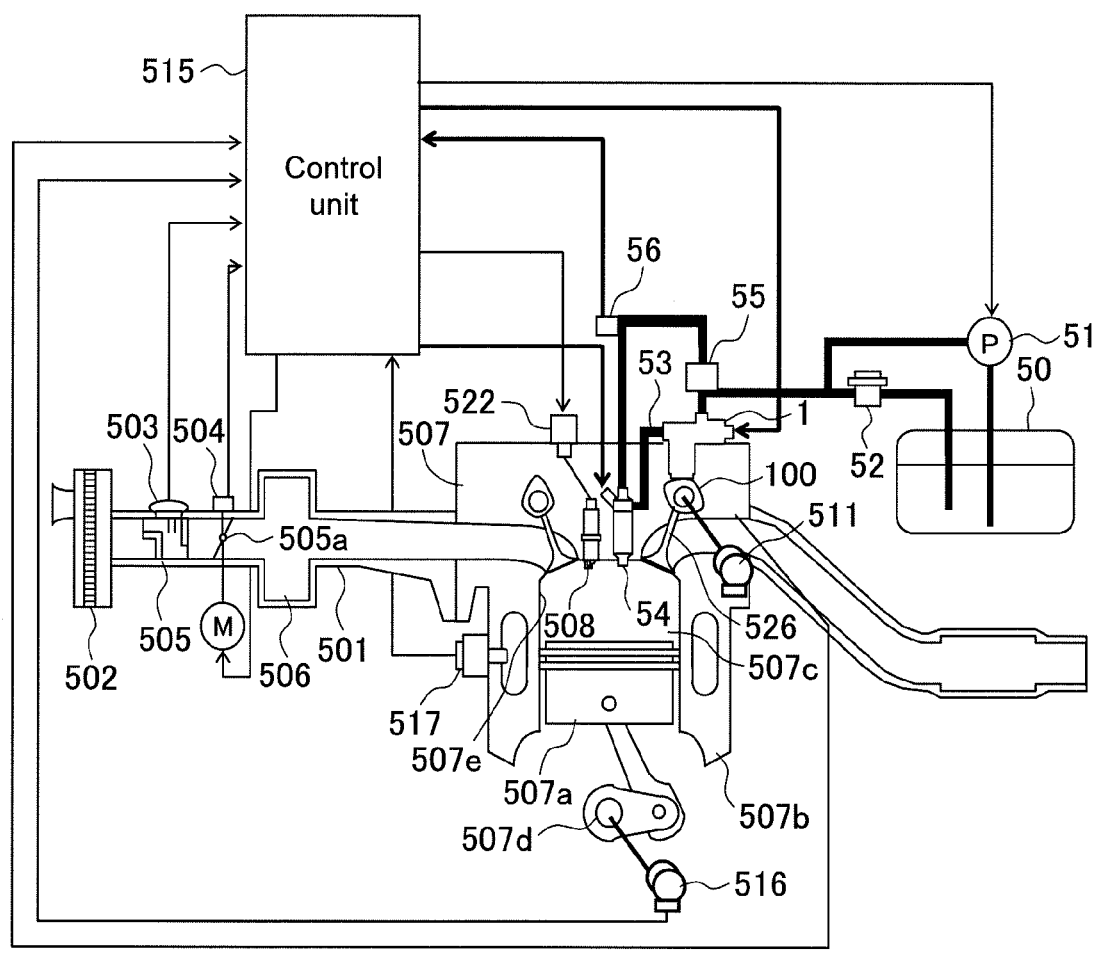
FIG. 1 is an overall configuration diagram illustrating a control system of an engine to which a control device according to the present invention is applied.

DESCRIPTION OF SYMBOLS 54 injector
201 combustion period POS signal extraction unit
202 combustion period POS signal cycle calculation unit
203 reference crank angle cycle calculation unit
204 crank angle cycle ratio calculation unit
205 first ignition timing correction value calculation unit
207 second ignition timing correction value calculation unit
208 final ignition timing calculation unit
301 combustion period POS signal extraction unit
302 combustion period POS signal cycle calculation unit
303 reference crank angle cycle calculation unit
304 crank angle cycle ratio calculation unit
305 first injection amount correction value calculation unit
306 second injection amount correction value calculation unit
308 final injection amount calculation unit
507 engine
508 spark plug
511 phase sensor
515 control unit
516 position sensor
522 ignition coil

BEST MODE FOR CARRYING OUT THE INVENTION

Hereinafter, an embodiment of a control device for an internal combustion engine according to the present invention is described with reference to the drawings.

FIG. 1 illustrates an overall configuration of a control system of an internal combustion engine (engine) 507. The engine 507 includes a plurality of combustion chambers 507c which are defined by: a plurality of cylinder bores 507e formed in an engine main body 507b; and pistons 507a provided to the respective cylinder bores 507e. In the present embodiment, the engine 507 is configured as a four-cylinder engine including the four combustion chambers 507c.

Air flowing into each of the combustion chambers 507c is taken in through an entrance portion of an air cleaner 502, passes through an air flow meter (air flow sensor) 503, then passes through a throttle body 505 which houses an electrically controlled throttle valve 505a which controls an intake flow rate, and enters a collector 506. The air taken into the collector 506 is distributed by an intake pipe 501 connected to each cylinder of the engine 507, and then flows into the respective combustion chambers 507c.

The air flow sensor 503 outputs a signal indicating an intake air flow rate to a control unit (engine control device) 515. A throttle sensor 504 which detects the opening degree of the electrically controlled throttle valve 505a is attached to the throttle body 505. The throttle sensor 504 outputs a signal indicating a throttle opening degree to the control unit 515. Fuel such as gasoline is sucked from a fuel tank 50 by a low-pressure fuel pump 51 to be primarily pressurized, is subjected to pressure adjustment by a fuel pressure regulator 52 so as to have a given pressure (for example, 0.3 Mpa), further is secondarily pressurized by a high-pressure fuel pump 1 so as to have a higher pressure (for example, 5.0 Mpa), and is supplied to a common rail 53.

A fuel injection valve (hereinafter, referred to as injector) 54 is attached to the common rail 53 for each of the combustion chambers 507c. The injector 54 injects the fuel supplied to the common rail 53 directly to the corresponding combustion chamber 507c. A spark plug 508 is attached to the engine main body 507b for each of the combustion chambers 507c. When a voltage which has been made higher is applied to the spark plug 508 through an ignition coil 522 on the basis of an ignition signal, the spark plug 508 performs spark discharge, to thereby ignite the fuel injected into the combustion chambers 507c.

The engine 507 is provided with a crank angle sensor (hereinafter, referred to as position sensor 516) which detects a rotation angle of a crankshaft 507d.

The position sensor 516 corresponds to unit crank angle detection means, and outputs, to the control unit 515, a position signal (POS signal) corresponding to a crank angle signal each time the crankshaft 507d rotates by a predetermined angle, for example, 10 degrees (deg), that is, for each unit crank angle.

The engine 507 is provided with a cam angle sensor (hereinafter, phase sensor 511) which detects a rotation angle of a camshaft (not shown) including a mechanism which variably sets open/close timing of an exhaust valve 526. The phase sensor 511 corresponds to reference rotation position detection means, and outputs, to the control unit 515, a REF signal indicating a reference rotation position of the camshaft (crankshaft 507d) for each predetermined rotation angle of the camshaft, for example, 180 degrees (deg).

It should be noted that the cam angle signal (REF signal) outputted by the phase sensor 511 also serves as an angle signal indicating a rotation position of a driving cam 100 for the high-pressure fuel pump which rotates together with the rotation of a camshaft of the exhaust valve 526. Although not illustrated, a phase of the camshaft is changed by a variable valve timing control device, and a position of the cam angle signal is also changed in accordance with a change amount thereof.

Figure 2:
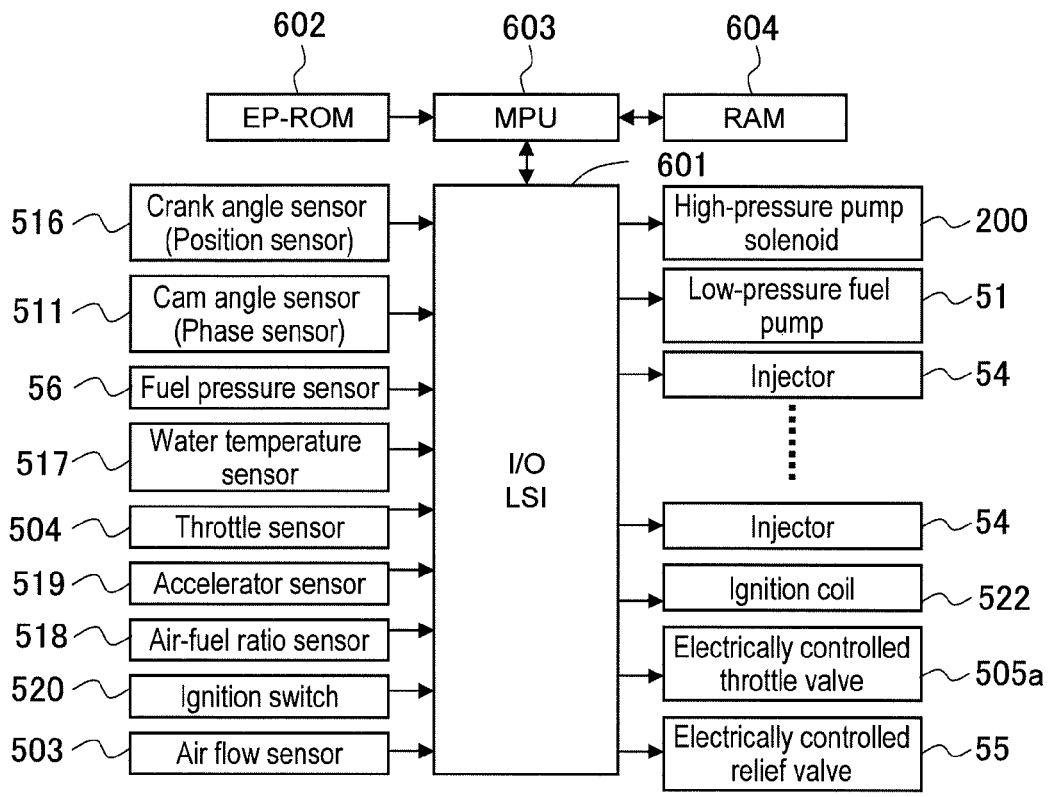
FIG. 2 is a block diagram illustrating an internal configuration of a control unit according to the present embodiment.

The control unit 515 has an electronically controlled system including a microcomputer, and includes an MPU 603, an EP-ROM 602, a RAM 604, an I/O LSI 601 including an A/D converter, and the like as illustrated in FIG. 2.

The control unit 515 receives signals from the position sensor 516, the phase sensor 511, a fuel pressure sensor 56, a water temperature sensor 517, the throttle sensor 504, an accelerator sensor 519, an air-fuel ratio sensor 518, an ignition switch 520, and the air flow sensor 503, and executes predetermined arithmetic processing. The control unit 515 outputs various control signals obtained as a result of the arithmetic processing, to the injector 54 of each cylinder, the ignition coil 522, a high-pressure pump solenoid 200, the low-pressure fuel pump 51, the electrically controlled throttle valve 505a, and an electrically controlled relief valve 55, and executes fuel injection amount control, ignition timing control, and the like.

Figure 3:
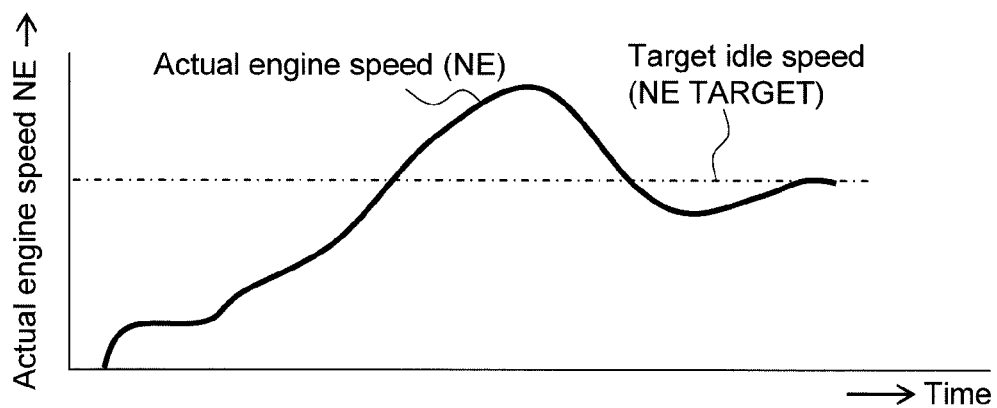
FIG. 3 is a graph showing a behavior example of an engine speed at the start of the engine.

FIG. 3 shows a behavior example of an engine speed at the start of the engine. At the start of the engine, the engine is cranked by a starter, and then a mixture gas inside of each of the combustion chambers 507c is ignited. As a result, the mixture gas is combusted, and the crankshaft 507d rotates as an engine output.

An actual engine speed (NE) which is a rotation speed of the crankshaft 507d is low immediately after the cranking. However, because the electrically controlled throttle valve 505a is sufficiently opened immediately after the cranking, the actual engine speed (NE) once exceeds a target idle speed (NE TARGET), and after that, the opening degree of the electrically controlled throttle valve 505a is controlled so that the engine speed becomes the target idle speed (NE TARGET), whereby the engine speed converges to the target idle speed (NE TARGET).

In this way, the engine output more than necessary is generated for starting, and hence a total amount of an exhaust emission gas and the engine speed rapidly change. Accordingly, the control accuracy of a fuel injection amount and ignition timing is deteriorated, which makes further impossible to maintain the control accuracy of an air-fuel ratio, so that deterioration of an exhaust emission gas concentration is induced.

Figure 4:
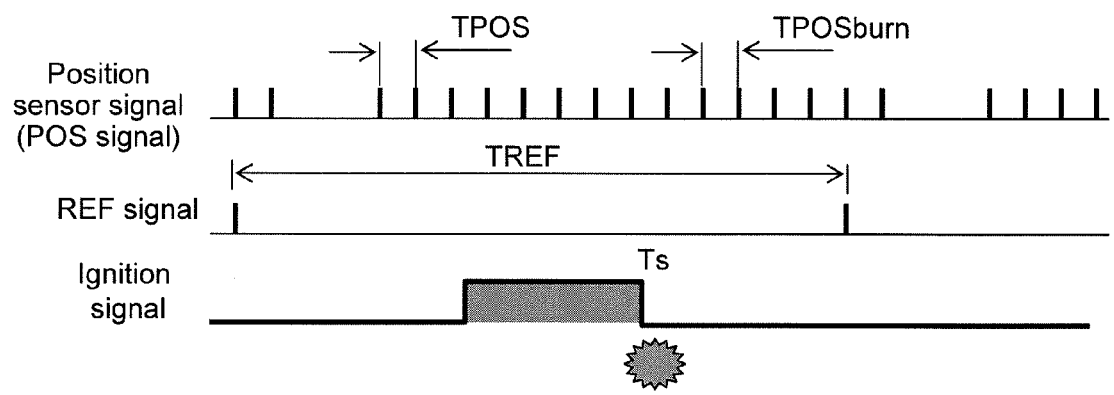
FIG. 4 is a graph showing a relation between a POS signal, a REF signal, and an ignition signal.

FIG. 4 shows a relation between the position sensor signal (POS signal), the REF signal, and the ignition signal.

The POS signal, which is shown in an upper part of the figure, is a signal of a crank angle at, for example, a 10-degree (deg) interval, and partially has a so-called tooth missing portion in which a signal is not generated at the 10-degree (deg) interval. The control unit 515 determines the crank angle of the engine 507 by means of the position sensor signal (POS signal).

An interval period of the POS signal at the 10-degree (deg) interval, that is, a POS signal cycle TPOS shows a crank angle speed per unit crank angle of 10 degrees (deg), and is calculated by the control unit 515 each time the POS signal is generated. A POS signal cycle TPOS burn in the figure is a POS signal cycle when a mixture gas inside of the combustion chamber 507c is combusted, and is a POS signal cycle at a point at which the engine speed is increased by a torque generated by the combustion of the mixture gas and the POS signal cycle accordingly becomes the shortest. The POS signal cycle TPOS burn is referred to as a combustion period POS signal cycle.

The combustion period POS signal cycle TPOS burn is a POS signal interval representative of a combustion period of the engine 507, and thus may be set to an interval of the POS signal which is obtained after a desired crank angle at which the combustion starts to affect the engine speed has passed from an ignition position (a time point Ts at which energization of the ignition coil is ended). Alternatively, a POS signal cycle TPOS having the shortest cycle may be extracted from one reference crank angle cycle TREF to be set as the combustion period POS signal cycle TPOS burn. The POS signal which serves as the criterion for calculating the combustion period POS signal cycle TPOS burn is referred to as a POS burn.

The REF signal, which is shown in a middle part of the figure, is a signal of the crank angle at, for example, a 180-degree (deg) interval, and is used for the ignition timing control and the injection timing control as a reference crank angle signal which serves as the criterion for control corresponding to the crank angle.

The reference crank angle cycle TREF shows one cycle (time) of the REF signal, that is, a crank angle speed for each 180-degree rotation of the crankshaft 507d, and is calculated by the control unit 515 each time the REF signal is generated.

In a lowermost part of the figure, an energization signal which controls the ignition timing and is supplied to the ignition coil 522 is shown, and the mixture gas inside of the combustion chamber 507c is ignited at the time point Ts at which the energization is ended. As a result, the mixture gas inside of the combustion chamber 507c is combusted.

A change in engine speed is caused by the engine output generated by this combustion. The state of the engine output, in other words, the combustion state of the engine 507 can be detected by a ratio R of the combustion period POS signal cycle TPOS burn and the reference crank angle cycle TREF, that is, the ratio R=TPOS burn/TREF. The ratio R is referred to as a crank angle cycle ratio R.

As described above, the combustion period POS signal cycle TPOS burn shows the interval (interval period) between the POS signals during the combustion, and the reference crank angle cycle TREF shows the interval (interval period) between the REF signals. Therefore, for the sake of convenience, when the crank angle cycle ratio R is calculated on the assumption that the POS signal cycle TPOS and the reference crank angle cycle TREF are in the same section (the same crank angle), the crank angle cycle ratio R can be easily handled. For example, in the case where the interval between the position sensor signals=10 deg and the interval between the REF signals=180 deg, the crank angle cycle ratio R may be TPOS burn×18/TREF.

As a result of the calculation process of the crank angle cycle ratio R, if the ratio R=1, the result shows a state where the engine speed due to the combustion is constant (the engine speed is maintained). If the ratio R<1, the result shows a state where the engine speed due to the combustion is increasing. Further, if the ratio R>1, the result shows a state where the engine speed due to the combustion is decreasing.

In this way, the value of TPOS burn×18/TREF, that is, the crank angle cycle ratio R is obtained, which makes it possible to obtain a state value of the engine output due to the combustion. As a result, it becomes possible to control the engine speed behavior at the start of the engine.

TPOS burn×18 for calculating the ratio R described above differs depending on the interval between the POS signals, the interval between the REF signals, and the number of cylinders, and thus is expressed as TPOS burn×n in the following description. The letter n denotes the number of POS signals between two REF signals.

Figure 5:
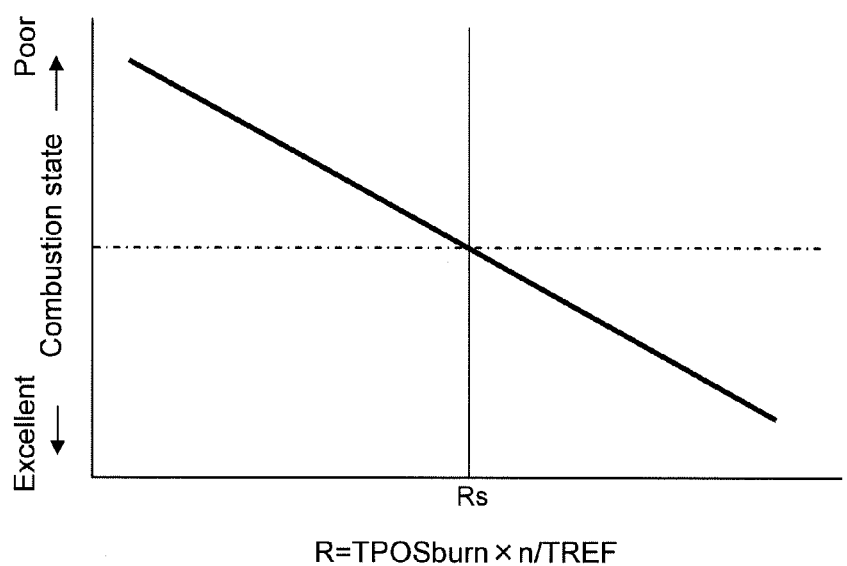
FIG. 5 is a graph showing a relation between a crank angle cycle ratio and a combustion state of the engine.

FIG. 5 shows a relation between the crank angle cycle ratio R and the combustion state of the engine.

As the crank angle cycle ratio R becomes smaller than a reference value Rs, an increase rate of the engine speed becomes higher (faster), so that the combustion state of the engine can be determined to be excellent. In contrast to this, as the crank angle cycle ratio R becomes larger than the reference value Rs, the increase rate of the engine speed becomes lower (slower), so that the combustion state of the engine can be determined to be poor.

Here, the reference value Rs may be set to TPOS burn×n/TREF=1.0 at which the engine speed is maintained as described above. Factors that make the value of TPOS burn×n/TREF different from the reference value Rs include various conditions and environment such as an amount of air supplied to the engine 507, fuel properties, an atmospheric pressure, and an atmosphere temperature (engine cooling water temperature). It should be noted that the respective factors are generally known, and in addition, the degree of influence thereof is not related directly to the present invention, so that the detailed description thereof is omitted.

As has been described hereinabove, the crank angle cycle ratio R=TPOS burn×n/TREF is calculated, which makes it possible to detect the behavior of the engine speed due to the combustion of the internal combustion engine 507 with an excellent responsiveness and in an accurate manner. As a result, the crank angle cycle ratio R can serve as a parameter effective for engine speed control at the start of the engine.

Figure 6:
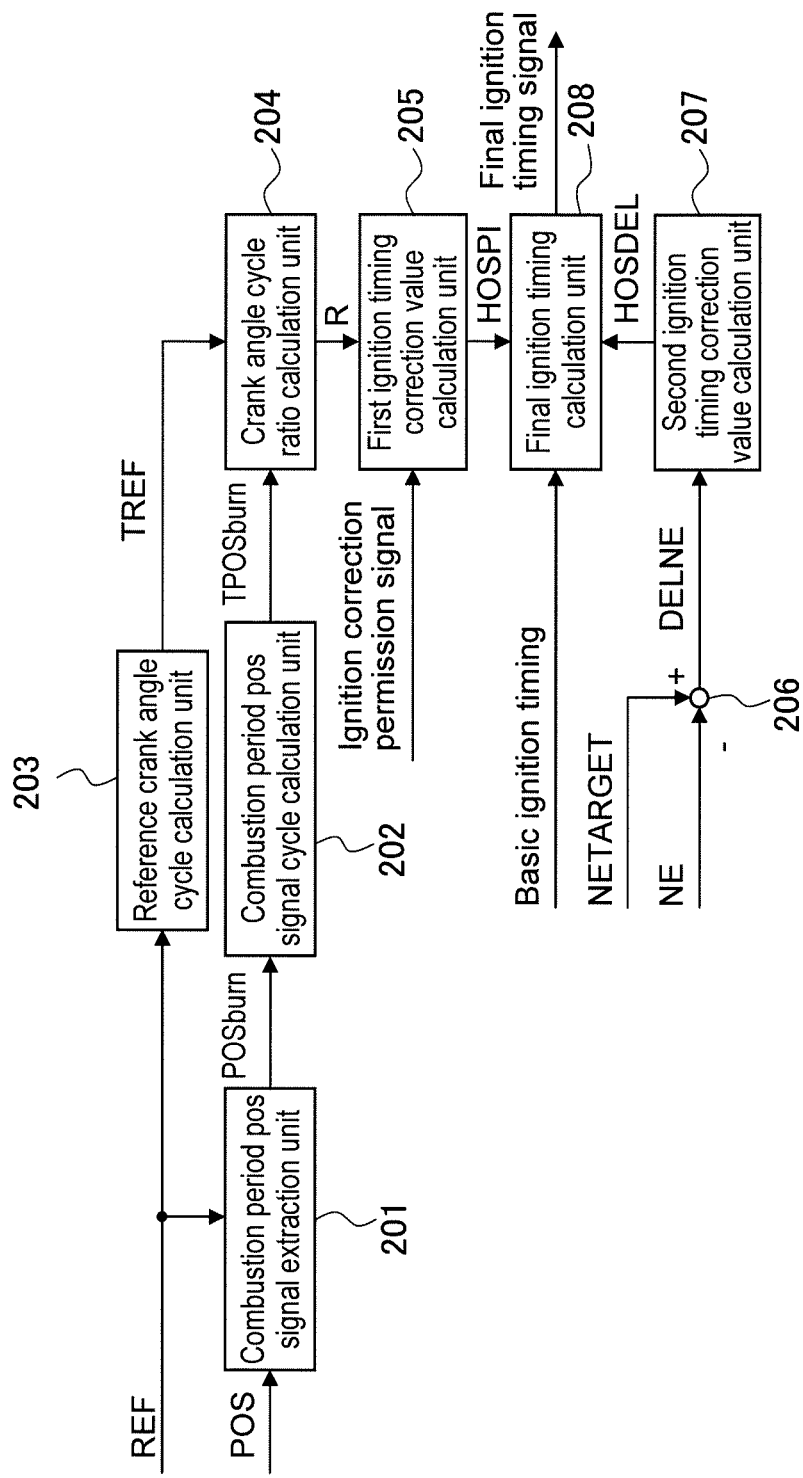
FIG. 6 is a block diagram illustrating an embodiment of an ignition timing correction control device which performs ignition timing correction at the start of the engine.

An embodiment of a control device which performs control at the start of the engine with the use of the crank angle cycle ratio R is described with reference to FIG. 6. This control device is an ignition timing control device, and is implemented when the control unit 515 executes a computer program.

The ignition timing control device includes a combustion period POS signal extraction unit 201, a combustion period POS signal cycle calculation unit (combustion period crank angle cycle calculation means) 202, a reference crank angle cycle calculation unit 203, a crank angle cycle ratio calculation unit 204, a first ignition timing correction value calculation unit 205, a second ignition timing correction value calculation unit 207, and a final ignition timing calculation unit 208.

The combustion period POS signal extraction unit 201 receives the POS signal outputted by the position sensor 516 and the REF signal outputted by the phase sensor 511, and extracts the POS signal burn which is obtained after a desired crank angle at which the combustion starts to affect the engine speed has passed from the ignition position.

The combustion period POS signal cycle calculation unit 202 measures an interval (time) between the POS signal burn extracted by the combustion period POS signal extraction unit 201 and the next POS signal, to thereby calculate the combustion period POS signal cycle TPOS burn. Alternatively, the combustion period POS signal cycle calculation unit 202 may extract a POS signal cycle TPOS having the shortest cycle from one reference crank angle cycle TREF to set the extracted cycle as the combustion period POS signal cycle TPOS burn.

The reference crank angle cycle calculation unit 203 receives the REF signal outputted by the phase sensor 511, and measures a time length of one cycle of the REF signal, to thereby calculate the reference crank angle cycle TREF.

The crank angle cycle ratio calculation unit 204 takes in information concerning the combustion period POS signal cycle TPOS burn and the reference crank angle cycle TREF from the combustion period POS signal cycle calculation unit 202 and the reference crank angle cycle calculation unit 203, respectively, and performs the calculation of TPOS burn×n/TREF, to thereby calculate the crank angle cycle ratio R.

Figure 7:
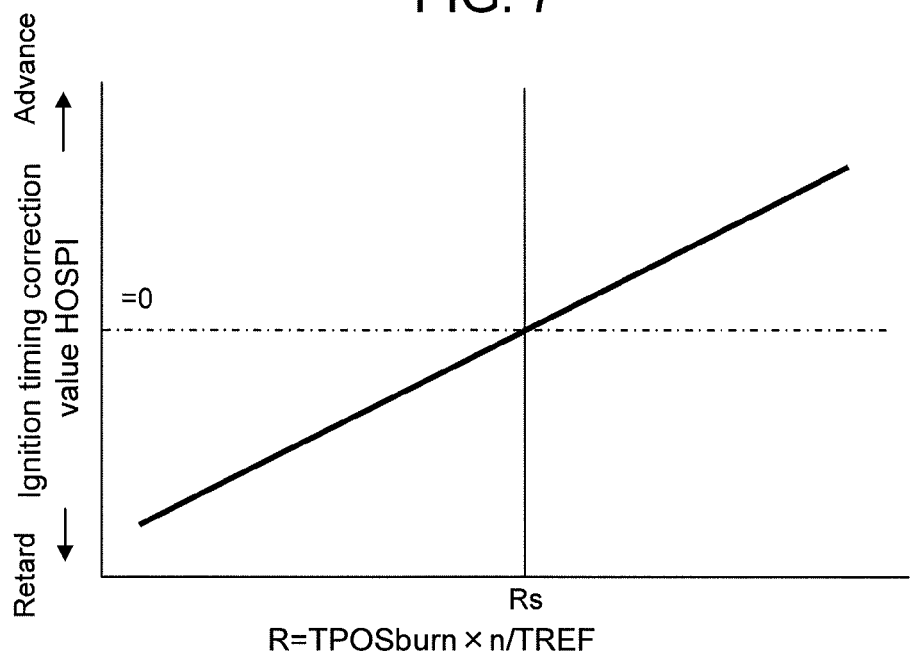
FIG. 7 is a graph showing a relation between a crank angle cycle ratio and an ignition timing correction value according to the present embodiment.

The first ignition timing correction value calculation unit 205 takes in information indicating the crank angle cycle ratio R from the crank angle cycle ratio calculation unit 204 and an ignition correction permission signal. In the case where the ignition correction permission signal is on, that is, at the time of ignition correction permission, the first ignition timing correction value calculation unit 205 calculates an ignition timing correction value HOSPI based on the crank angle cycle ratio R. With regard to the ignition timing correction value HOSPI, as shown in FIG. 7, when the crank angle cycle ratio R=Rs=1, HOSPI=0. As R becomes smaller than 1, the ignition timing is corrected so as to be more retarded toward the retard side. As R becomes larger than 1, the ignition timing is more advanced toward the advance side.

Figure 18:
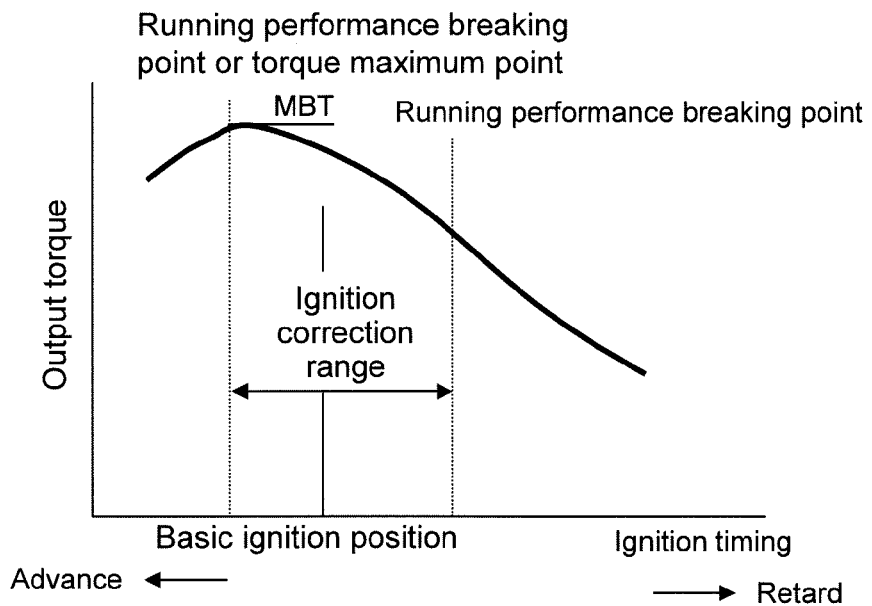
FIG. 18 is a graph showing a relation between an engine output and ignition timing.

As shown in FIG. 18, when the ignition timing is advanced toward the advance side, the engine output (output torque) increases up to the MBT. On the other hand, when the ignition timing is retarded toward the retard side, the engine output decreases.

Owing to the relation between the engine output and the ignition timing, in the case where the crank angle cycle ratio R is smaller than a desired reference value, the combustion power of the engine 507 is relatively large, and hence the ignition timing is corrected toward the retard side, whereby an excessive increase in engine speed is suppressed. In the case where the crank angle cycle ratio R is larger than the desired reference value, the combustion power of the engine 507 is relatively small, and hence the ignition timing is corrected toward the advance side, whereby an increase in engine speed is promoted. In this way, the ignition timing of the engine 507 is corrected in accordance with the value of TPOS burn×n/TREF=R, which makes it possible to appropriately control the increase and decrease in engine speed at the start of the engine.

The second ignition timing correction value calculation unit 207 receives, from a deviation calculation unit 206, information indicating a deviation DELNE of the actual engine speed NE with respect to the target idle speed NE TARGET, that is, the deviation DELNE=NE TARGET−NE, to thereby calculate an ignition timing correction value HOSDEL according to the deviation DELNE. It should be noted that the actual engine speed N can be calculated by the cycle of the REF signal and the cycle of the POS signal.

Figure 8:
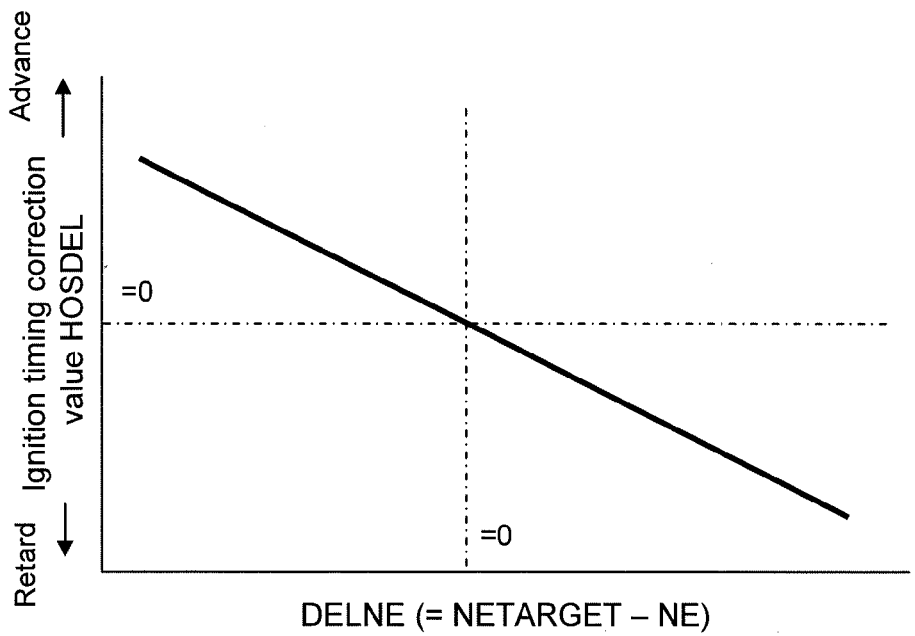
FIG. 8 is a graph showing a relation between an engine speed deviation and an ignition timing correction value according to the present embodiment.

The relation between the deviation DELNE and the ignition timing correction value HOSDEL is shown in FIG. 8. DELNE=0 (the target idle speed=the actual engine speed) shows that the actual speed NE of the engine 507 and the target idle speed NE TARGET coincide with each other. In this case, the ignition timing correction corresponding to the deviation is unnecessary, and hence setting is made so that HOSDEL=0. In the case where the actual engine speed NE is lower than the target idle speed NE TARGET (DELNE has a negative value), in order to improve the engine output, setting for shifting the ignition timing toward the advance side is made so that the ignition timing correction value HOSDEL>0. On the other hand, in the case where the actual engine speed NE is higher than the target idle speed NE TARGET (DELNE has a positive value), in order to suppress the engine output, setting for shifting the ignition timing toward the retard side is made so that the ignition timing correction value HOSDEL<0.

It should be noted that the relation between the deviation DELNE and the ignition timing correction value HOSDEL can be acquired not only by calculation using an arithmetic expression but also by a data table indicating a relation between the two (DELNE and HOSDEL) which is obtained in advance by an experiment.

The final ignition timing calculation unit 208 adds, to reference ignition timing, both of the ignition timing correction value HOSPI corresponding to the crank angle cycle ratio R and the ignition timing correction value HOSDEL corresponding to the deviation DELNE, to thereby set final ignition timing, and then outputs a final ignition timing signal to the ignition coil 522.

The ignition timing correction using the ignition timing correction value HOSPI corresponding to the crank angle cycle ratio R can control the slope of engine speed growth, but cannot control the engine speed after the start of the engine to converge to the target speed. Therefore, this ignition timing correction cannot be sufficient for the engine speed control at the start of the engine. In this regard, the ignition timing correction using the ignition timing correction value HOSDEL corresponding to the deviation DELNE is also performed, whereby the engine speed converges to the target speed while the engine speed growth at the start of the engine is controlled.

Figure 9:
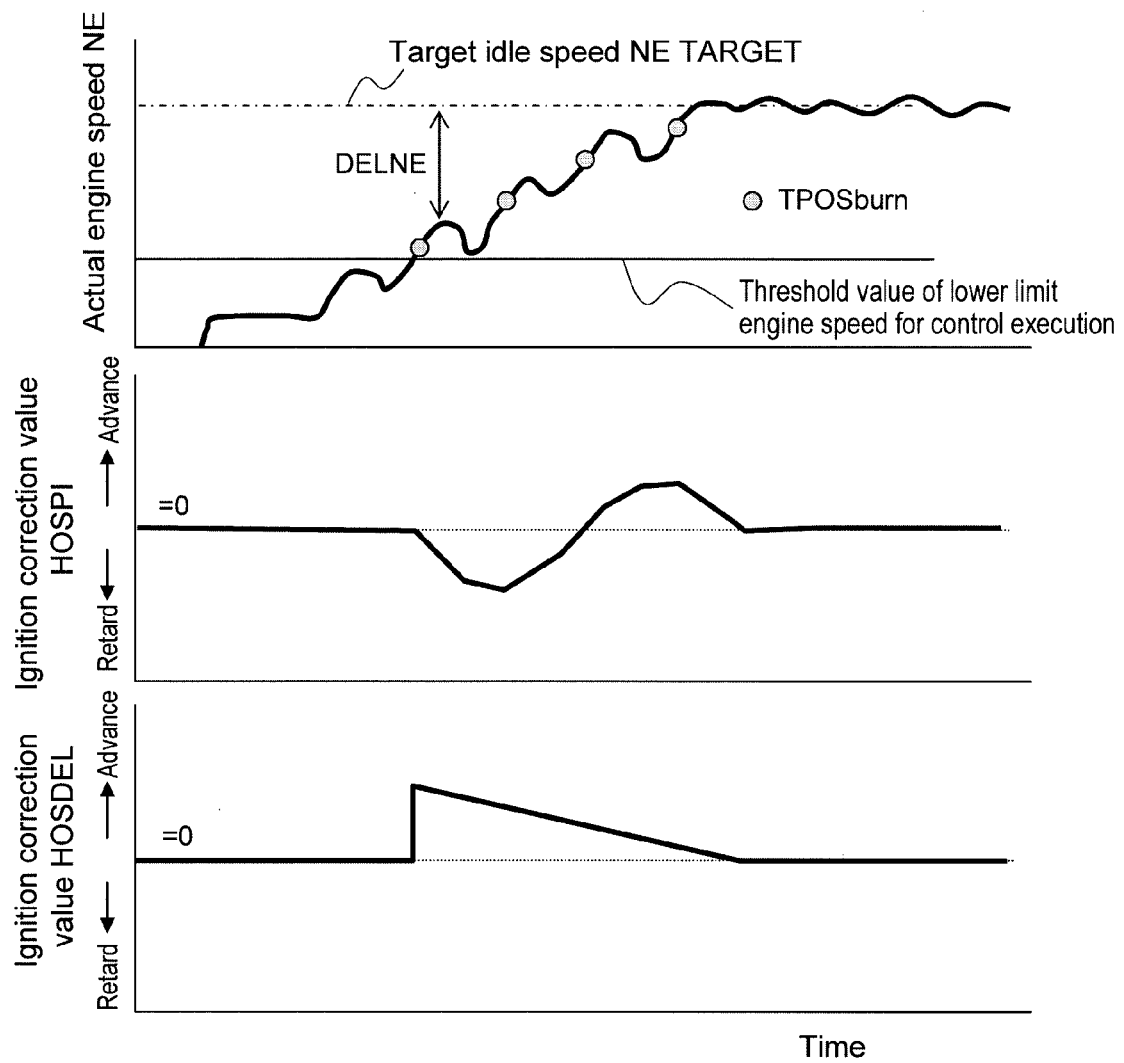
FIG. 9 is a time chart at the start of the engine according to the present embodiment.

FIG. 9 is a time chart showing the ignition timing control at the start of the engine.

An upper part of FIG. 9 shows the actual engine speed NE at the start of the engine. The actual engine speed NE reaches a desired target idle speed NE TARGET while repeating the following cycle. That is, at the start of the engine, the actual engine speed NE is increased by the combustion of the mixture gas inside of the combustion chamber 507c. Until the combustion of the next cylinder occurs, the actual engine speed NE is decreased by a friction of the engine 507 and the like. When the next cylinder is combusted, the actual engine speed NE increases again.

Portions marked with O in the figure show simulated positions corresponding to the combustion period POS signal cycles TPOS burn. The crank angle cycle ratio R=TPOS burn×n/TREF is calculated using the combustion period POS signal cycle TPOS burn, to thereby calculate the ignition timing correction value HOSPI, and the calculation result is shown in a middle part of the figure. As described above, the ignition correction using the ignition timing correction value HOSPI corresponding to the crank angle cycle ratio R serves to correct the slope of the engine speed growth at the start of the engine.

A lower part of the figure shows the ignition timing correction value HOSDEL corresponding to the deviation DELNE of the actual engine speed NE of the engine 507 with respect to the target idle speed NE TARGET. The ignition correction using the ignition timing correction value HOSDEL corresponding to the deviation DELNE serves to correct the actual engine speed NE at the start of the engine so as to converge to the target idle speed.

The ignition timing correction values HOSPI and HOSDEL which are calculated as described above in accordance with the actual engine speed at the start of the internal combustion engine are used for feedback correction on the ignition position of the next cylinder to be combusted, which makes it possible to promptly converge the actual engine speed to the target idle speed.

Figure 10:
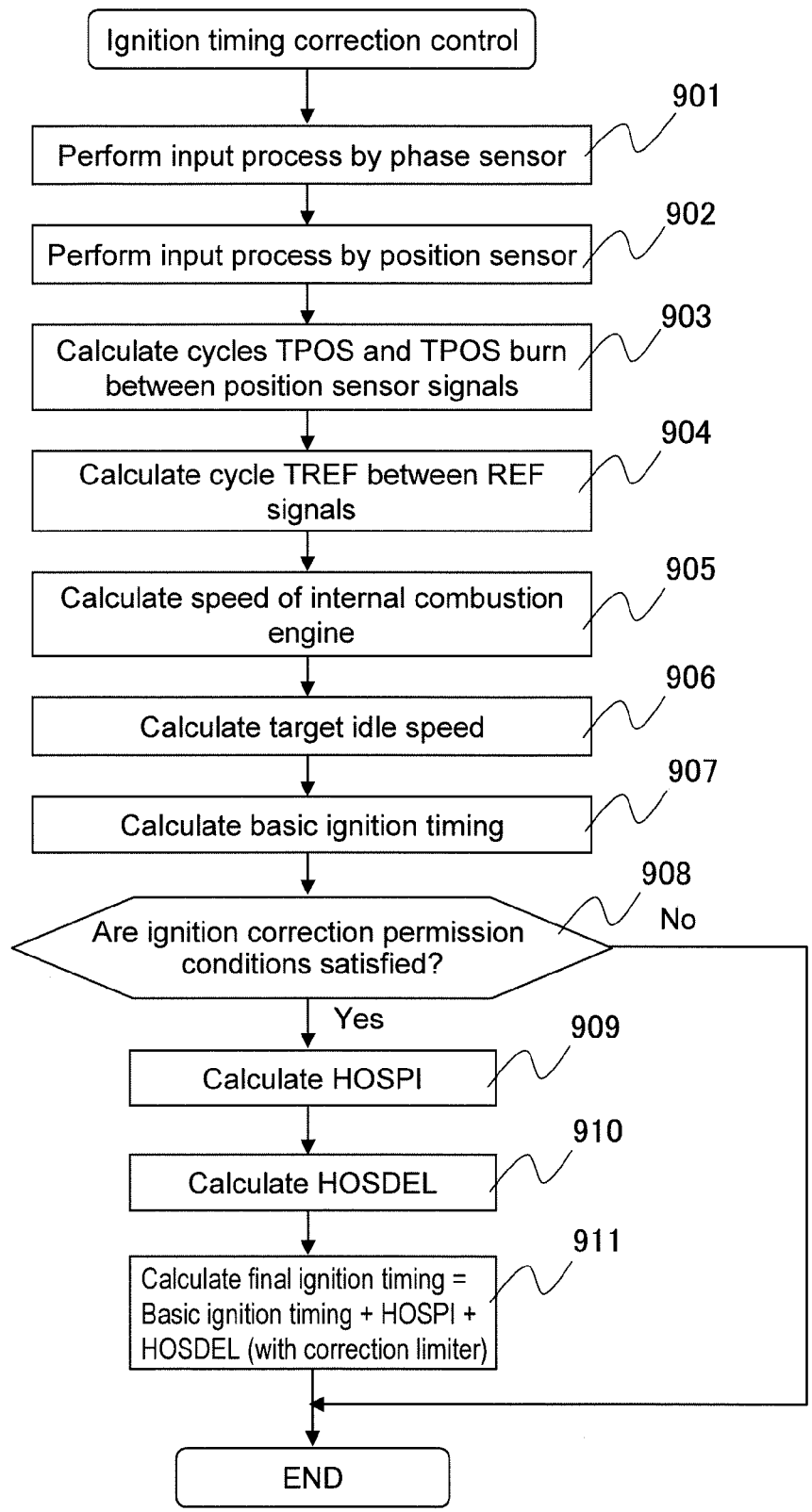
FIG. 10 is a flow chart showing ignition timing correction control according to the present embodiment.

FIG. 10 is a flow chart showing the ignition timing correction control according to the present embodiment.

First, an input process of the REF signal by the phase sensor 511 is performed (Step 901). Subsequently, an input process of the POS signal by the position sensor 516 is performed (Step 902).

Next, the input cycle (POS signal cycle) TPOS of the POS signal of the position sensor 516 and the combustion period POS signal cycle TPOS burn are calculated (Step 903).

Next, the reference crank angle cycle TREF which is the input cycle of the REF signal of the phase sensor 511 is calculated (Step 904).

Next, the speed of the internal combustion engine (actual engine speed NE) is calculated on the basis of the input cycle TPOS of the POS signal and the reference crank angle cycle TREF (Step 905).

Next, the target idle speed NE TARGET and the basic ignition timing are calculated in accordance with the operation state of the engine 507 (Steps 906 and 907).

Next, it is decided whether or not the ignition timing correction at the start of the engine is executed by a signal from an ignition correction permission determination unit 1010 to be described later (Step 908). In the case where ignition timing correction conditions at the start of the engine are satisfied, the calculation of the crank angle cycle ratio R=TPOS burn×n/TREF is performed, and the ignition timing correction value HOSPI corresponding to the crank angle cycle ratio R is calculated (Step 909). In addition, the calculation of the deviation DELNE of the actual engine speed NE with respect to the target idle speed NE TARGET, that is, the deviation DELNE=NE TARGET−NE is performed, and the ignition timing correction value HOSDEL corresponding to the deviation DELNE is calculated (Step 910).

Lastly, the basic ignition timing is corrected by the ignition timing correction values HOSPI and HOSDEL, to thereby decide the final ignition timing, and a signal for controlling the energization of the ignition coil 522 and energization end timing is outputted (Step 911). This ignition timing correction is performed with a limiter.

In the present embodiment, the ignition timing correction is performed by adding the ignition timing correction values HOSPI and HOSDEL to the basic ignition timing. Alternatively, correction by multiplication or division may be adopted as long as this ignition timing correction can realize an equivalent control function for realizing the actual engine speed at the start of the engine and the target idle speed.

Figure 11:
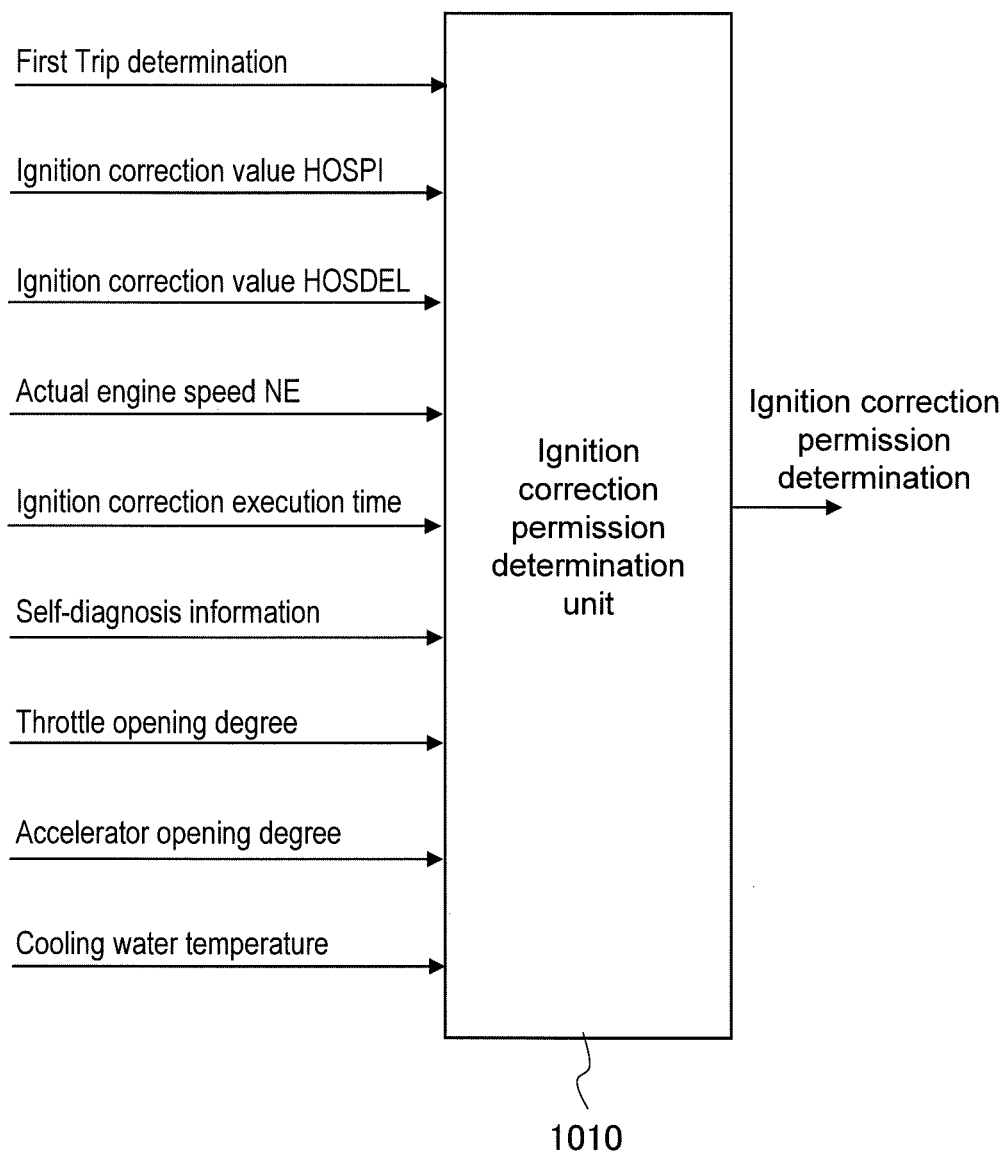
FIG. 11 is a block diagram illustrating ignition correction permission determination according to the present embodiment.

FIG. 11 illustrates the ignition correction permission determination unit 1010 which performs permission determination of the ignition timing correction at the start of the engine according to the present embodiment. The ignition correction permission determination unit 1010 performs the ignition correction permission determination under the following conditions.

(1) The ignition timing correction control at the start of the engine is limitedly executed only for one trip (first Trip) of an operation of the engine 507, and even when another condition is satisfied during the same running, the ignition timing correction at the start of the engine according to the present embodiment is not executed again during the operation of the engine (is limitedly executed at the start of the engine). In the case where the ignition timing correction at the start of the engine is unnecessarily executed in a normal operation state, this ignition timing correction interferes with another ignition timing control at a normal time, so that the engine output may deviate from the MBT of the ignition timing. As a result, deterioration in running performance and deterioration in fuel efficiency may be induced. However, the adoption of this condition makes it possible to avoid such a trouble.

(2) Determination using the magnitudes of the ignition timing correction values HOSPI and HOSDEL. When the actual engine speed NE converges to the target idle speed NE TARGET of the engine to be kept stable, these ignition timing correction values become substantially 0, so that substantial correction control is not performed. In such a case, the calculation of the ignition timing correction is unnecessary. Therefore, the ignition timing correction at the start of the engine according to the present embodiment is prohibited, which thus prevents the unnecessary correction calculation from being performed. As a result, it becomes possible to reduce a calculation load on the MPU 603 of the control unit 515.

(3) Determination using the actual engine speed NE. In the case where it is determined that the actual engine speed NE converges to the target idle speed NE TARGET to be kept stable, the ignition timing correction at the start of the engine according to the present embodiment is unnecessary. In addition, if the ignition timing correction control for suppressing an increase in engine speed is performed in response to the fact that the combustion state is excellent, deterioration in starting merchantability of the internal combustion engine is caused. Therefore, until the actual engine speed NE becomes sufficiently lower than the target idle speed at the start of the engine and reaches a threshold value (for example, 500 r/min) of the engine speed at which the above-mentioned merchantability is not impaired, the ignition timing correction at the start of the engine according to the present embodiment is not executed. When the actual engine speed NE exceeds the threshold value, the ignition timing correction at the start of the engine according to the present embodiment is started.

(4) Determination using a period of time for which execution conditions of the ignition timing correction at the start of the engine are satisfied. In the case where the ignition timing correction is not cancelled by another condition in spite of the fact that the ignition timing correction control at the start of the engine according to the present embodiment is executed for a long period of time, for example, for more than 10 seconds, the ignition timing correction is forcibly terminated. That is, a period of time for which the ignition timing correction is executed is measured, and in the case where this period of time becomes equal to or longer than a predetermined value, the ignition timing correction is terminated or prohibited. According to this determination, for example, in the case where a fuel is not supplied to the engine 507 or in the case where various sensors or actuators for controlling the combustion of the engine 507 or the engine speed break down, the ignition timing correction at the start of the engine according to the present embodiment does not need to be unnecessarily performed, and the determination thereof is performed indirectly on the basis of the elapsed time.

(5) Determination using self-diagnosis results of each sensor or actuator. According to this determination, the self-diagnosis results are reflected, and in the case where a breakdown is determined by the self-diagnosis, the execution of the ignition timing correction at the start of the engine according to the present embodiment is prohibited.

(6) Determination using the throttle opening degree and the accelerator opening degree. According to this determination, in the case where a driver does not have an intention to bring the engine into an idle state, the ignition timing correction at the start of the engine according to the present embodiment is prohibited. In this way, it is intended to prevent the deterioration in running performance from being induced by the ignition timing correction at the start of the engine according to the present embodiment which is performed when the driver has an intention to bring the engine into an off-idle state.

(7) Determination using the cooling water temperature of the engine 507. In the case where the engine is started under an extremely low temperature environment (for example, −30° C.), it is generally known that, with regard to the starting performance of the engine, the fuel supplied to the engine 507 requires a longer time to start the engine than a warm up state due to deterioration in atomization of the fuel or attachments thereof. In order to secure the starting performance of the engine at the time of such an extremely low water temperature, the ignition timing correction at the start of the engine according to the present embodiment is prohibited.

Figure 12:
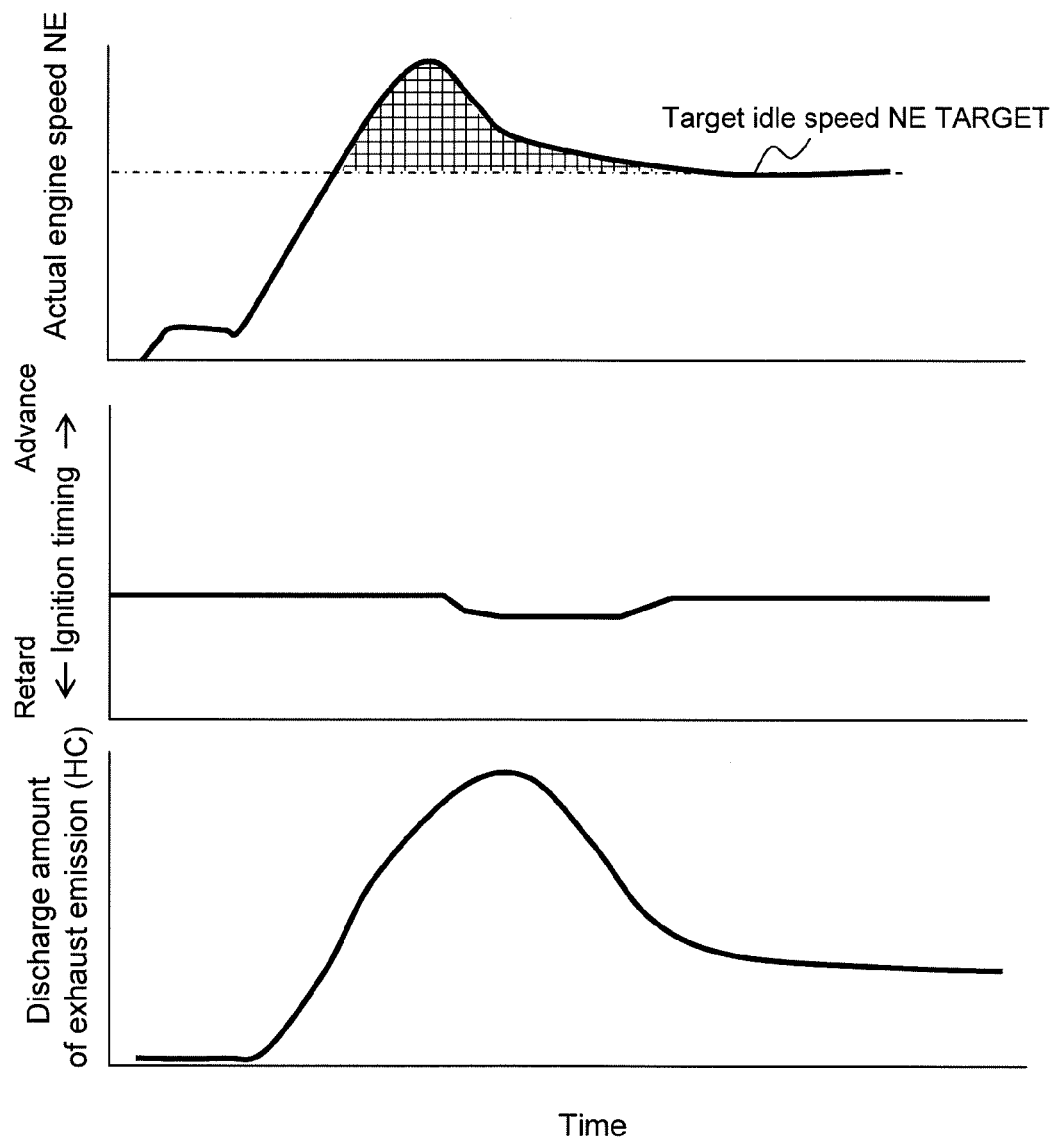
FIG. 12 is a time chart at the start when the control according to the present embodiment is not applied.
Figure 13:
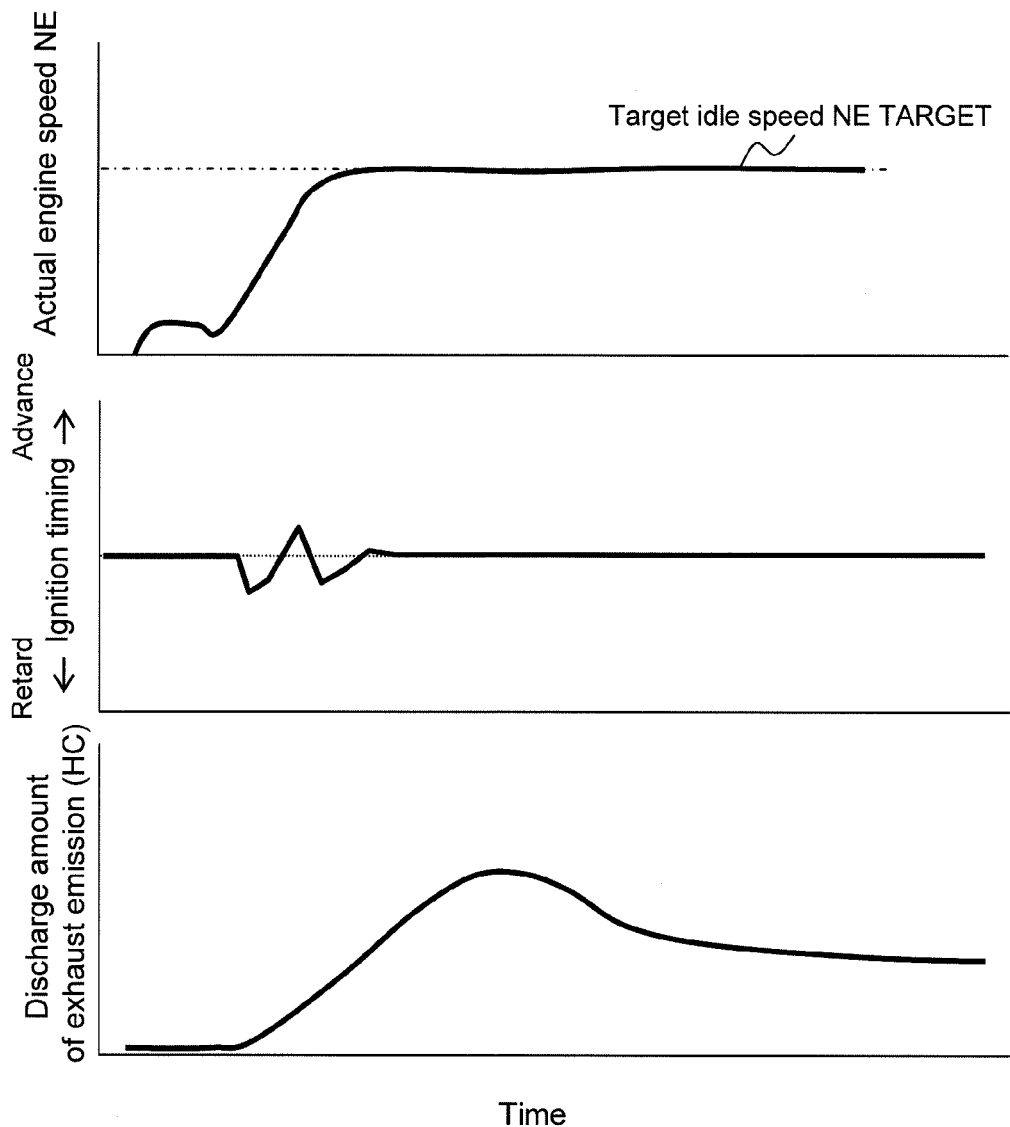
FIG. 13 is a time chart at the start when the control according to the present embodiment is applied.

FIG. 12 is a time chart at the start of the engine when the ignition timing correction at the start of the engine according to the present embodiment is not applied, and FIG. 13 is a time chart at the start of the engine when the ignition timing correction at the start of the engine according to the present embodiment is applied.

In the case as shown in FIG. 12 where the ignition timing correction at the start of the engine according to the present embodiment is not applied, the actual engine speed NE once experiences a portion at which the actual engine speed NE exceeds the target idle speed NE TARGET (a hatching portion in the figure). After that, the actual engine speed NE is controlled so as to become the target idle speed NE TARGET, on the basis of the ignition timing and engine speed feedback control performed by the electrically controlled throttle (not shown).

Because the actual engine speed NE experiences exceeding the target idle speed NE TARGET, a discharge amount of exhaust emission (HC) discharged from the engine becomes larger.

In contrast to this, if the ignition timing correction at the start of the engine according to the present embodiment is applied, as shown in FIG. 13, the growth of the engine speed at the start of the engine is controlled to be increased or decreased by advancing or retarding the ignition timing, and the actual engine speed NE promptly converges to the target idle speed NE TARGET. As a result, it is possible to realize the engine starting in which the discharge amount of the exhaust emission (HC) to be discharged is prevented from increasing.

Next, a description is given of the limiter which limits the ignition timing correction values. As described above, in order to control the engine speed, the ignition timing is corrected toward the advance side or the retard side with respect to the basic ignition timing on the basis of the calculation values of the ignition timing correction values HOSPI and HOSDEL, and it is necessary to set a limit on the resultant ignition timing. The relation is shown in FIG. 18.

As described above, FIG. 18 shows the relation between the engine output and the ignition timing. A running performance breaking point of the engine or a torque maximum point of the engine exists on the advance side of the ignition timing, and if the ignition timing is controlled to be advanced more than this point, the deterioration in running performance occurs or an increase in torque expected by advancing the ignition timing is not obtained.

On the other hand, a running performance breaking point also exists on the retard side of the ignition timing similarly to the advance side, and if the ignition timing is controlled to be retarded more than this point, the deterioration in running performance is caused.

In view of the above, it is necessary to limit the correction values for the ignition timing correction at the start of the engine. Therefore, irrespective of the calculation result of the crank angle cycle ratio R=TPOS burn×n/TREF or the deviation DELNE which is the ignition timing correction parameter described above, a limit is set on the ignition timing correction values HOSPI and HOSDEL, a value obtained by adding the ignition timing correction values HOSPI and HOSDEL, or a value of the final ignition timing which has been subjected to the ignition timing correction (the values are caused to fall within an ignition correction range in the figure), which makes it possible to avoid the deterioration in running performance.

The ignition timing limit range between the ignition advance side and the ignition retard side is different depending on the operation state of the engine and the engine speed, and hence the ignition timing range may be changed in accordance with the operation state of the engine and the engine speed.

The above-mentioned action of the ignition timing correction at the start of the engine can be equivalently obtained by the fuel injection amount correction. This fuel injection amount correction has an excellent responsiveness in fuel supply to a combustion chamber, and thus is particularly effective for an in-cylinder direct-injection internal combustion engine which injects a fuel directly into the combustion chamber. However, this fuel injection amount correction can be also applied to a port-injection internal combustion engine which injects a fuel to an intake port, and thus is remarkably versatile without restriction on the selection of a fuel injection system.

Figure 14:
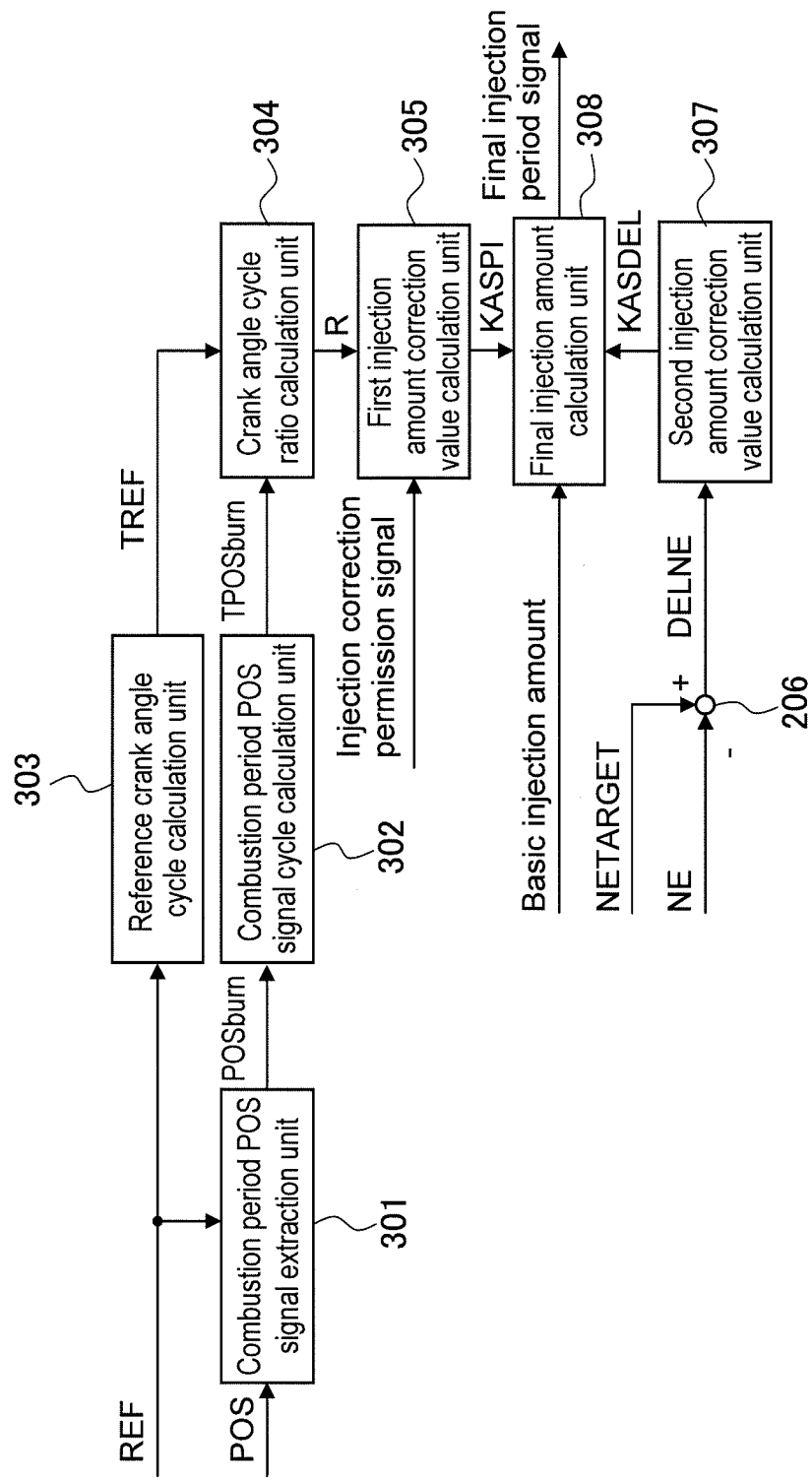
FIG. 14 is a block diagram illustrating an embodiment of a fuel injection amount correction control device which performs ignition timing correction at the start of the engine.

An embodiment of a control device which performs the fuel injection control at the start of the engine with the use of the crank angle cycle ratio R is described with reference to FIG. 14. This control device is also implemented when the control unit 515 executes a computer program.

The fuel injection control device includes a combustion period POS signal extraction unit 301, a combustion period POS signal cycle calculation unit (combustion period crank angle cycle calculation means) 302, a reference crank angle cycle calculation unit 303, a crank angle cycle ratio calculation unit 304, a first injection amount correction value calculation unit 305, a second injection amount correction value calculation unit 307, and a final injection amount calculation unit 308.

The combustion period POS signal extraction unit 301 receives the POS signal outputted by the position sensor 516 and the REF signal outputted by the phase sensor 511, and extracts the POS signal burn which is obtained after a desired crank angle at which the combustion starts to affect the engine speed has passed from the ignition position.

The combustion period POS signal cycle calculation unit 302 measures an interval (time) between the POS signal burn extracted by the combustion period POS signal extraction unit 301 and the next POS signal, to thereby calculate the combustion period POS signal cycle TPOS burn. Alternatively, the combustion period POS signal cycle calculation unit 302 may extract a POS signal cycle TPOS having the shortest cycle from one reference crank angle cycle TREF to set the extracted cycle as the combustion period POS signal cycle TPOS burn.

The reference crank angle cycle calculation unit 303 receives the REF signal outputted by the phase sensor 511, and measures a time length of one cycle of the REF signal, to thereby calculate the reference crank angle cycle TREF.

The crank angle cycle ratio calculation unit 304 takes in information concerning the combustion period POS signal cycle TPOS burn and the reference crank angle cycle TREF from the combustion period POS signal cycle calculation unit 302 and the reference crank angle cycle calculation unit 303, respectively, and performs the calculation of TPOS burn×n/TREF, to thereby calculate the crank angle cycle ratio R.

Figure 15:
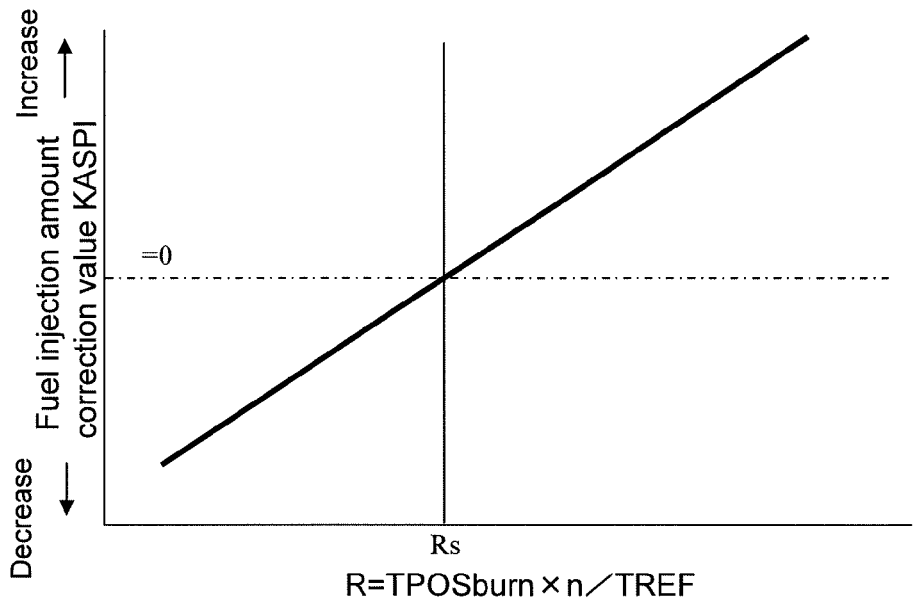
FIG. 15 is a graph showing a relation between the crank angle cycle ratio and a fuel injection amount correction value according to the present embodiment.

The first injection amount correction value calculation unit 305 takes in information indicating the crank angle cycle ratio R from the crank angle cycle ratio calculation unit 304 and an injection amount correction permission signal. In the case where the injection amount correction permission signal is on, that is, at the time of injection amount permission, the first injection amount correction value calculation unit 305 calculates a fuel injection amount correction value KASPI based on the crank angle cycle ratio R. With regard to the fuel injection amount correction value KASPI, as shown in FIG. 15, when the crank angle cycle ratio R=Rs=1, KASPI=0. As R becomes smaller than 1, the fuel injection amount is corrected so as to be more decreased. As R becomes larger than 1, the fuel injection amount is corrected so as to be more increased.

Figure 19:
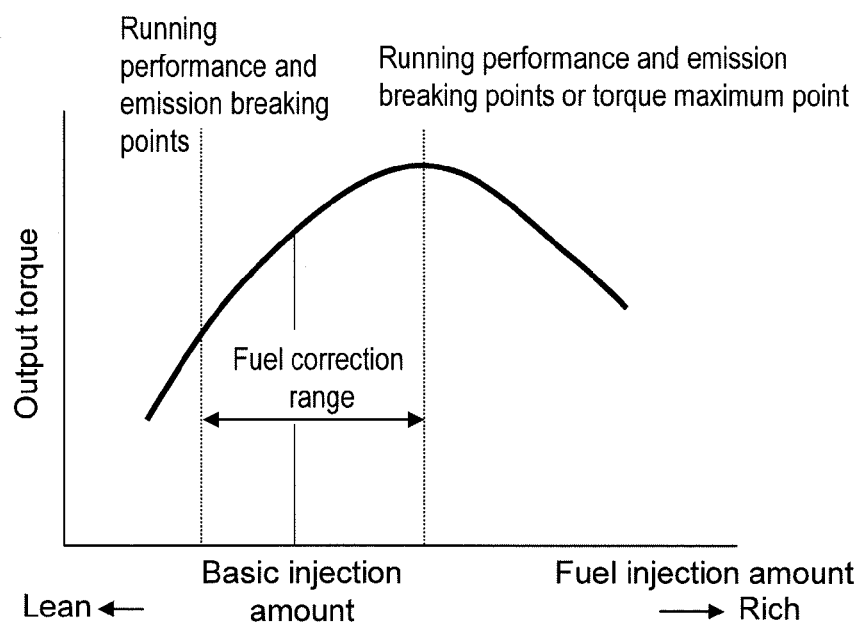
FIG. 19 is a graph showing a relation between the engine output and a fuel injection amount.

As shown in FIG. 19, when the fuel injection amount is increased (toward the rich side), the engine output (output torque) increases up to the torque maximum point. On the other hand, when the fuel injection amount is decreased (toward the lean side), the engine output decreases. This relation is equivalent to the relation between the engine output and the ignition timing which is described with reference to FIG. 18. Therefore, when the correction control similar to the ignition timing correction is performed on the fuel injection amount, it is possible to perform the engine speed control at the start of the engine similar to the above-mentioned ignition timing correction (HOSPI and HOSDEL).

Owing to the above-mentioned relation between the engine output and the fuel injection amount, in the case where the crank angle cycle ratio R is smaller than a desired reference value, the combustion power of the engine 507 is relatively large, and hence decrease correction of the fuel injection amount is performed, whereby an excessive increase in engine speed is suppressed. In the case where the crank angle cycle ratio R is larger than the desired reference value, the combustion power of the engine 507 is relatively small, and hence increase correction of the fuel injection amount is performed, whereby an increase in engine speed is promoted. In this way, the fuel injection amount is corrected in accordance with the value of TPOS burn×n/TREF=R, which makes it possible to appropriately control the increase and decrease in engine speed at the start of the engine.

The second injection amount correction value calculation unit 307 receives, from the deviation calculation unit 206, information indicating the deviation DELNE of the actual engine speed NE with respect to the target idle speed NE TARGET, that is, the deviation DELNE=NE TARGET−NE, to thereby calculate a fuel injection amount correction value KASDEL according to the deviation DELNE.

Figure 16:
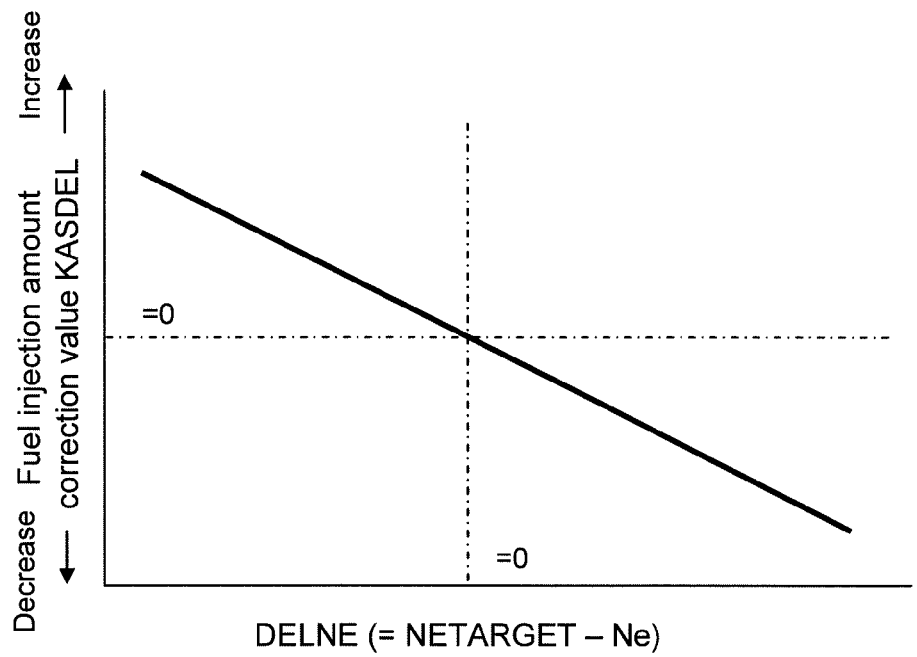
FIG. 16 is a graph showing a relation between the engine speed deviation and a fuel injection amount correction value according to the present embodiment.

The relation between the deviation DELNE and the fuel injection amount correction value KASDEL is shown in FIG. 16. DELNE=0 (the target idle speed=the actual engine speed) shows that the actual speed NE of the engine 507 and the target idle speed NE TARGET coincide with each other. In this case, the fuel injection amount correction corresponding to the deviation is unnecessary, and hence setting is made so that the fuel injection amount correction value KASDEL=0. In the case where the actual engine speed NE is lower than the target idle speed NE TARGET (DELNE has a negative value), setting for increasing the fuel injection amount is made so that the fuel injection amount correction value KASDEL>0. On the other hand, in the case where the actual engine speed NE is higher than the target idle speed NE TARGET (DELNE has a positive value), setting for decreasing the fuel injection amount is made so that the fuel injection amount correction value KASDEL<0.

It should be noted that the relation between the deviation DELNE and the fuel injection amount correction value KASDEL can be acquired not only by calculation using an arithmetic expression but also by a data table indicating a relation between the two (DELNE and KASDEL) which is obtained in advance by an experiment.

The final injection amount calculation unit 308 adds, to a reference injection amount, both of the fuel injection amount correction value KASPI corresponding to the crank angle cycle ratio R and the fuel injection amount correction value KASDEL corresponding to the deviation DELNE, to thereby set a final injection amount, and then outputs a final injection amount signal to the injector 54.

The fuel injection amount correction using the fuel injection amount correction value KASPI corresponding to the crank angle cycle ratio R can control the slope of engine speed growth, but cannot control the engine speed after the start of the engine to converge to the target speed. Therefore, this fuel injection amount correction cannot be sufficient for the engine speed control at the start of the engine. In this regard, the fuel injection amount correction using the fuel injection amount correction value KASDEL corresponding to the deviation DELNE is also added, whereby the engine speed converges to the target speed while the engine speed growth at the start of the engine is controlled.

Figure 17:
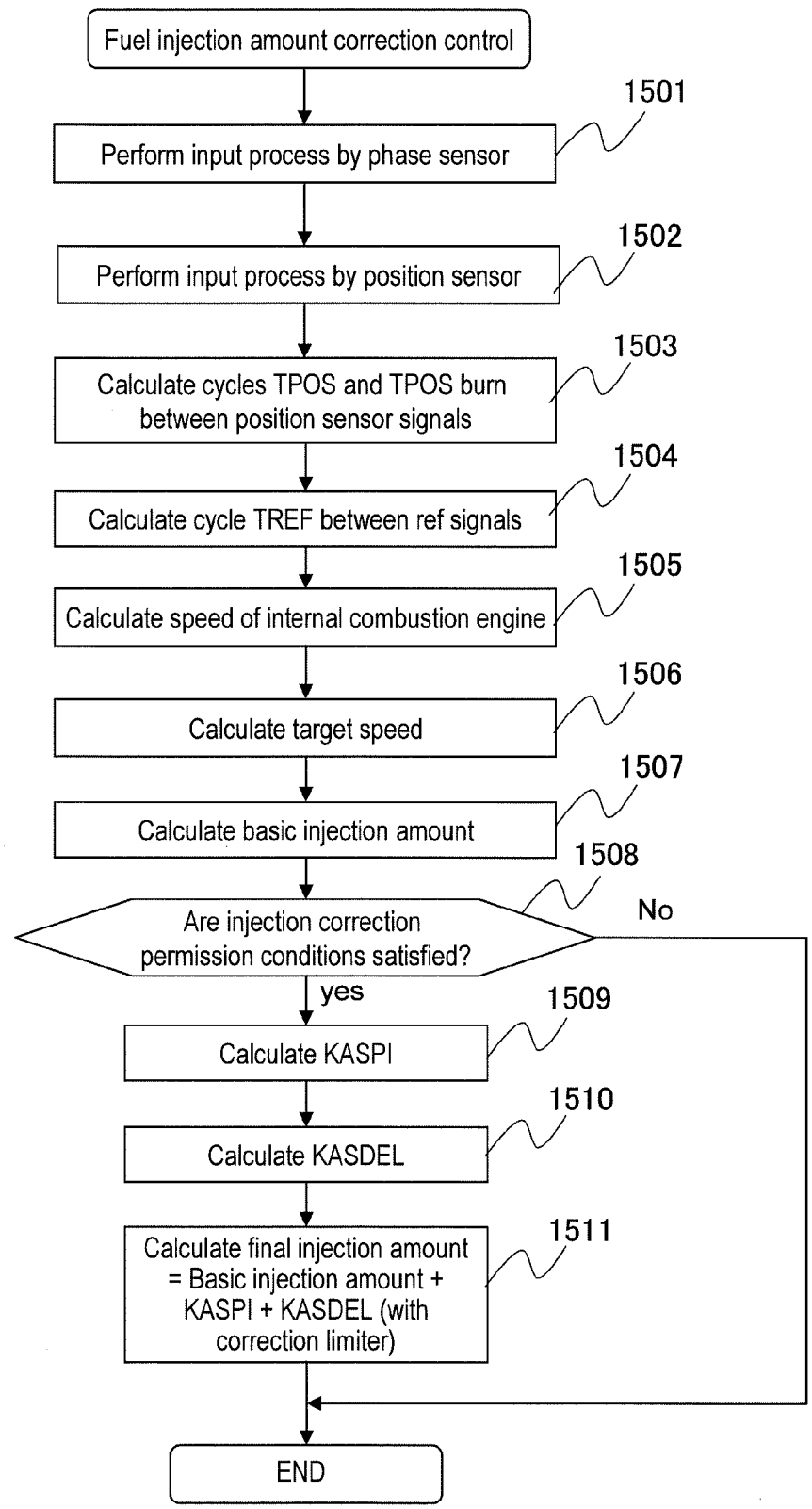
FIG. 17 is a flow chart showing fuel injection amount correction control according to the present embodiment.

FIG. 17 is a flow chart showing the fuel injection amount correction control according to the present embodiment.

First, an input process of the REF signal by the phase sensor 511 is performed (Step 1501). Subsequently, an input process of the POS signal by the position sensor 516 is performed (Step 1502).

Next, the input cycle TPOS of the POS signal of the position sensor 516 and the combustion period POS signal cycle TPOS burn are calculated (Step 1503).

Next, the reference crank angle cycle TREF which is the input cycle of the REF signal of the phase sensor 511 is calculated (Step 1504).

Next, the speed of the internal combustion engine (actual engine speed NE) is calculated on the basis of the input cycle TPOS of the POS signal and the reference crank angle cycle TREF (Step 1505).

Next, the target idle speed NE TARGET and the basic injection amount are calculated in accordance with the operation state of the engine 507 (Steps 1506 and 1507).

Next, it is decided whether or not the fuel injection amount correction at the start of the engine is executed by a signal from an injection correction permission determination unit which is similar to the ignition correction permission determination unit 1010 illustrated in FIG. 11 (Step 1508). For example, a period of time for which the fuel injection amount correction is executed is measured, and in the case where this period of time becomes equal to or longer than a predetermined value, the fuel injection amount correction is terminated or prohibited. In the case where fuel injection amount correction conditions at the start of the engine are satisfied, the calculation of the crank angle cycle ratio R=TPOS burn× n/TREF is performed, and the fuel injection amount correction value KASPI corresponding to the crank angle cycle ratio R is calculated (Step 1509). In addition, the calculation of the deviation DELNE of the actual engine speed NE with respect to the target idle speed NE TARGET, that is, the deviation DELNE=NE TARGET−NE is performed, and the fuel injection amount correction value KASDEL corresponding to the deviation DELNE is calculated (Step 1510).

Lastly, the basic injection amount is corrected by the fuel injection amount correction values KASPI and KASDEL, to thereby decide the final injection amount, and the decided injection amount is outputted to the injector 54 for pulse width control (Step 1511). This fuel injection amount correction is performed with a limiter. It should be noted that definitions of an invalid pulse width and a valid pulse width and a relation of output pulse widths based on such pulse widths are a known technology as the fuel injection control of the engine, and hence the description thereof is omitted.

In the present embodiment, the injection amount correction is performed by adding the fuel injection amount correction values KASPI and KASDEL to the basic fuel injection amount. Alternatively, correction by multiplication or division may be adopted as long as this injection amount correction can realize an equivalent control function for realizing the actual engine speed at the start of the engine and the target idle speed.

Next, a description is given of the limiter which limits the fuel injection amount correction values. The fuel injection amount is corrected so as to be increased or decreased with respect to the basic fuel injection amount on the basis of the calculation values of the fuel injection amount correction values KASPI and KASDEL, and it is necessary to set a limit on the resultant fuel injection amount (air-fuel ratio). The relation is shown in FIG. 19.

As described above, FIG. 19 shows an example of the relation between the engine output and the fuel injection amount. A running performance breaking point of the internal combustion engine or a torque maximum point of the internal combustion engine exists on the increase (rich) side of the fuel injection amount, and if the fuel injection amount (air-fuel ratio) is controlled to be increased more than this point, the deterioration in running performance or deterioration in exhaust emission occurs, or an increase in torque expected by increasing the fuel injection amount is not obtained.

On the other hand, a running performance breaking point or deterioration in exhaust emission also exists on the decrease (lean) side of the fuel injection amount similarly to the increase side, and if the fuel injection amount is controlled to be decreased more than this point, the deterioration in running performance or the deterioration in exhaust emission is caused.

In view of the above, it is necessary to limit the correction values for the fuel injection amount correction at the start of the engine. Therefore, irrespective of the calculation result of the crank angle cycle ratio R=TPOS burn×n/TREF or the deviation DELNE which is the fuel injection amount correction parameter described above, a limit is set on the fuel injection amount correction values KASPI and HOSDEL, a value obtained by adding the fuel injection amount correction values KASPI and KASDEL, or a value of the final ignition timing which has been subjected to the fuel injection amount correction (the values are caused to fall within a fuel correction range in the figure), which makes it possible to avoid the deterioration in running performance.

The fuel injection amount limit range between the fuel injection increase side and the fuel injection decrease side is different depending on the operation state of the engine and the engine speed, and hence the fuel injection amount range may be changed in accordance with the operation state of the engine and the engine speed.

It should be noted that the control device for the engine according to the present invention is not limitatively applied to an engine for an automobile, but can be applied to all industrial engines.

The control device for the engine according to the present invention measures a period of time for which any one of the ignition timing correction or the fuel injection amount is executed, and in the case where this period of time becomes equal to or longer than a predetermined value, the correction is terminated or prohibited.

The invention claimed is:

1. A control device for an internal combustion engine, comprising:
    reference rotation position detection means which detects a reference rotation position of a crankshaft of the internal combustion engine;
    unit crank angle detection means which outputs a crank angle signal per unit crank angle of the crankshaft;
    reference crank angle cycle calculation means which calculates a reference crank angle cycle on the basis of the reference rotation position detected by the reference rotation position detection means;
    combustion period crank angle cycle calculation means which calculates as a combustion period crank angle cycle one of: a cycle in which the cycle of the unit crank angle becomes shortest with respect to the reference crank angle cycle; and the cycle of the unit crank angle after a predetermined crank angle has passed from an ignition position;
    crank angle cycle ratio calculation means which calculates a crank angle cycle ratio which is a ratio of the combustion period crank angle cycle and the reference crank angle cycle; and
    correction means which corrects ignition timing or a fuel injection amount in accordance with the crank angle cycle ratio at a start of the internal combustion engine.

2. The control device for the internal combustion engine according to claim 1, wherein the correction means corrects the ignition timing in accordance with the crank angle cycle ratio, and performs retard correction and advance correction of the ignition timing on the basis of a magnitude relation between the crank angle cycle ratio and a reference value thereof.

3. The control device for the internal combustion engine according to claim 2, wherein the correction means sets a limit on the retard correction and the advance correction of the ignition timing.

4. The control device for the internal combustion engine according to claim 1, wherein the correction means corrects the fuel injection amount in accordance with the crank angle cycle ratio, and performs decrease correction and increase correction of the fuel injection amount on the basis of a magnitude relation between the crank angle cycle ratio and a reference value thereof.

5. The control device for the internal combustion engine according to claim 4, wherein the correction means sets a limit on the decrease correction and the increase correction of the fuel injection amount.

6. The control device for the internal combustion engine according to claim 3, wherein a value of the limit is changed by using, as a parameter, at least any one of an operation state of the internal combustion engine and a speed of the internal combustion engine.

7. The control device for the internal combustion engine according to claim 5, wherein a value of the limit is changed by using, as a parameter, at least any one of an operation state of the internal combustion engine and a speed of the internal combustion engine.

8. The control device for the internal combustion engine according to claim 1, further comprising another correction means which corrects the ignition timing or the fuel injection amount in accordance with a deviation of a speed of the internal combustion engine from a target idle speed.

9. The control device for the internal combustion engine according to claim 2, further comprising another correction means which corrects the ignition timing or the fuel injection amount in accordance with a deviation of a speed of the internal combustion engine from a target idle speed.

10. The control device for the internal combustion engine according to claim 1, wherein, at a first start at which an operation of the internal combustion engine is started, the correction of the ignition timing or the fuel injection amount at the start of the internal combustion engine, which is performed by the correction means, is prohibited by using, as a parameter, at least any one of: a correction value for the ignition timing or the fuel injection amount; an accelerator opening degree of the internal combustion engine; a throttle opening degree; a cooling water temperature; an engine speed; a correction execution time; and a breakdown determination of various sensors and various actuators.

11. The control device for the internal combustion engine according to claim 2, wherein, at a first start at which an operation of the internal combustion engine is started, the correction of the ignition timing or the fuel injection amount at the start of the internal combustion engine, which is performed by the correction means, is prohibited by using, as a parameter, at least any one of: a correction value for the ignition timing or the fuel injection amount; an accelerator opening degree of the internal combustion engine; a throttle opening degree; a cooling water temperature; an engine speed; a correction execution time; and a breakdown determination of various sensors and various actuators.

12. The control device for the internal combustion engine according to claim 1, wherein:
    in a case where it is determined that an accelerator opening degree of the internal combustion engine is equal to or smaller than a predetermined value, the correction of the ignition timing or the fuel injection amount is permitted; and
    in a case where it is determined that the accelerator opening degree is equal to or larger than the predetermined value, the correction is terminated or prohibited.

13. The control device for the internal combustion engine according to claim 2, wherein:
    in a case where it is determined that an accelerator opening degree of the internal combustion engine is equal to or smaller than a predetermined value, the correction of the ignition timing or the fuel injection amount is permitted; and
    in a case where it is determined that the accelerator opening degree is equal to or larger than the predetermined value, the correction is terminated or prohibited.

14. The control device for the internal combustion engine according to claim 1, wherein:
    in a case where it is determined that a throttle opening degree of the internal combustion engine is equal to or smaller than a predetermined value, the correction of the ignition timing or the fuel injection amount is permitted; and
    in a case where it is determined that the throttle opening degree is equal to or larger than the predetermined value, the correction is terminated or prohibited.

15. The control device for the internal combustion engine according to claim 2, wherein:
    in a case where it is determined that a throttle opening degree of the internal combustion engine is equal to or smaller than a predetermined value, the correction of the ignition timing or the fuel injection amount is permitted; and in a case where it is determined that the throttle opening degree is equal to or larger than the predetermined value, the correction is terminated or prohibited.

16. The control device for the internal combustion engine according to claim 1, wherein:

in a case where a cooling water temperature of the internal combustion engine falls within a predetermined value range, the correction of the ignition timing or the fuel injection amount is permitted; and in a case where the cooling water temperature falls outside of the predetermined value range, the correction is terminated or prohibited.

17. The control device for the internal combustion engine according to claim 2, wherein:

in a case where a cooling water temperature of the internal combustion engine falls within a predetermined value range, the correction of the ignition timing or the fuel injection amount is permitted; and in a case where the cooling water temperature falls outside of the predetermined value range, the correction is terminated or prohibited.

18. The control device for the internal combustion engine according to claim 1, wherein:

in a case where a speed of the internal combustion engine is equal to or lower than a predetermined value, the correction of the ignition timing or the fuel injection amount is prohibited; and in a case where the speed is equal to or larger than the predetermined value, the correction is permitted.

19. The control device for the internal combustion engine according to claim 1, wherein:

only at a first start at which an operation of the internal combustion engine is started, the correction of the ignition timing or the fuel injection amount is permitted; and after the correction has been once executed, the correction is not permitted during the operation.

20. The control device for the internal combustion engine according to claim 1, wherein:

a duration over which one of the ignition timing correction and the fuel injection amount correction is executed is measured; and if the duration is longer than a predetermined length, the correction is terminated or prohibited.

* * * * *